United States Patent

[11] 3,582,229

[72] Inventor Jost Eduard von Fellenberg
 Arbon, Switzerland
[21] Appl. No. 852,832
[22] Filed Aug. 25, 1969
[45] Patented June 1, 1971
[73] Assignee Hans A. Troesch
 Zurich, Switzerland
[32] Priority Sept. 3, 1968
[33] Switzerland
[31] 13,213

[54] CIRCULATING PUMP FOR HOT WATER HEATING SYSTEM
 9 Claims, 3 Drawing Figs.

[52] U.S. Cl. ................................................. 415/47, 236/12
[51] Int. Cl. .......................................................... F01b 25/00
[50] Field of Search .............................................. 415/47; 137/114; 236/12, 12 (A)

[56] References Cited
 UNITED STATES PATENTS

| | | | |
|---|---|---|---|
| 1,819,045 | 8/1931 | Snediker | 236/12A |
| 1,990,653 | 2/1935 | Kollsman | 236/12A |
| 2,542,273 | 2/1951 | Brown | 236/12A |
| 2,550,907 | 5/1951 | Brown | 236/12A |
| 2,985,107 | 5/1961 | Anderson | 415/47 |
| 3,482,777 | 12/1969 | Quinn | 236/12A |

Primary Examiner—C. J. Husar
Attorney—Kurt Kelman

ABSTRACT: A combined circulating pump and mixing valve for a hot water heating system comprises a single housing for the pump and the mixing valve. The mixing valve body is mounted in the housing between the hot and cold water inlets and the outlet, and the pump impeller is also mounted in the housing. The pressure differential produced by the impeller between its inlet and outlet is received by a device mounted in the housing, and this device controls the mixing valve body in response to the pressure differential transmitted to the device by the pump.

CIRCULATING PUMP FOR HOT WATER HEATING SYSTEM

The present invention relates to a combined circulating pump and mixing valve wherein the mixing valve body is controlled by means of the pressure differential produced between the inlet and outlet of the pump.

Conventional devices of this type are complicated in construction and, therefore, correspondingly costly and susceptible to breakdowns. In some fields of applications, particularly in heating systems, they necessitate complex circuits and relatively involved installation.

The above and other disadvantages are overcome in accordance with this invention with a combined circulating pump and mixing valve for a hot water system, which comprises a single housing for the pump and the mixing valve. A hot water inlet and a cold water inlet open into the housing, and a mixed water outlet leads from the housing. A mixing valve body is mounted in the housing between the inlets and the outlet. A pump impeller mounted in the housing produces a pressure differential between an inlet and an outlet thereof, and a device receiving the pressure differential and responsive thereto is mounted in the housing for controlling the mixing valve body in response to the pressure differential transmitted to the device by the pump.

The above and other features of the invention will become more apparent in the following detailed description of a now preferred embodiment, taken in conjunction with the accompanying drawing wherein FIG. 1 shows a pressure-difference-controlled valve arrangement in section along line I–I of FIG. 2;

Figure 1:
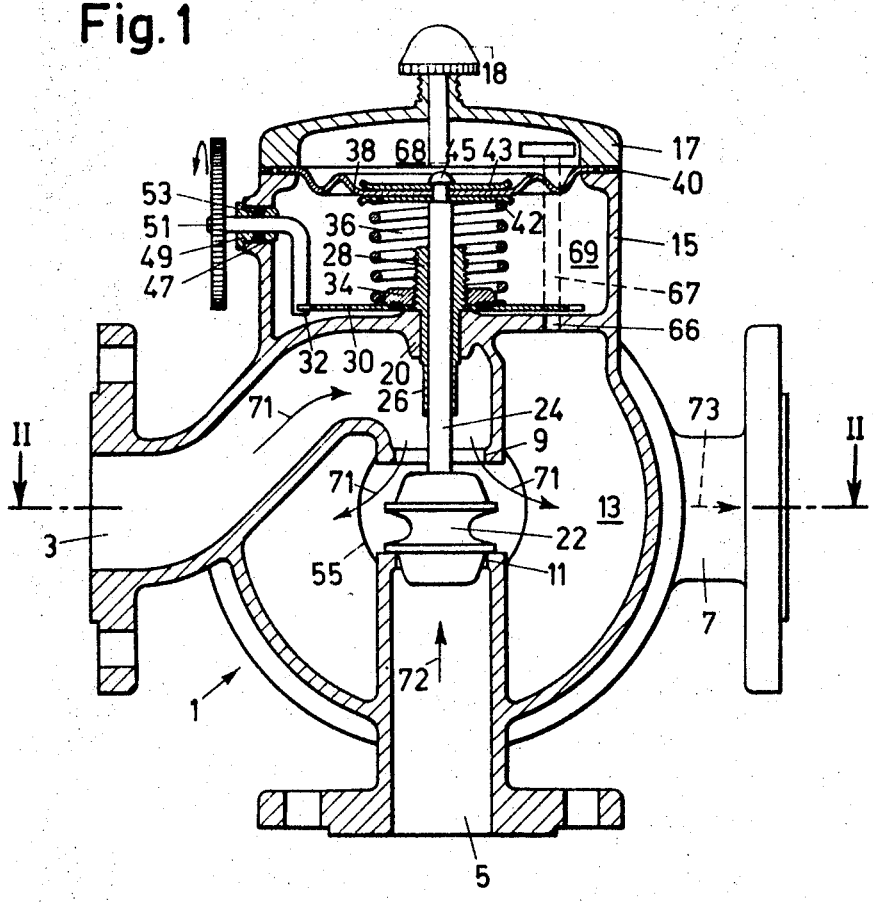

The pressure-difference-controlled valve of the present invention is suitable for fitting into heating systems, for instance, and is designed as a mixing valve with a valve housing 1. This housing 1 is provided with a hot-water inlet 3, a cold-water inlet 5 and a mixed-water outlet 7. The valve arrangement is designed as a double-acting, single-body valve having a valve seat 9 in the hot-water inlet and a valve seat 11 in the cold-water inlet. The two inlets open into a mixing chamber 13, from which the mixed water passes through a centrifugal pump in a later-described manner into the outlet or pressure line 7. The valve housing 1 carries a top housing 15 whose open top is closed with cover 17, for instance by screw fasteners (not shown). A knob 18 is mounted in cover 17, permitting manual operation of the valve. The valve housing 1 comprises a valve-bearing support 20 for receiving a valve guide bush 26 in which a valve spindle 24 is slidably mounted. One end of the spindle carries a valve body 22, while the other end has the shape of a rivet shank. The valve guide bush 26 threadedly is secured in the valve bearing support 20 although it may be press fit in the support, for instance. An upwardly protruding part of the bush 26 has an external thread 28 which carries a threaded ring 34 so connected to a pinion 30 that the two rotate together. The pinion 30 is provided on its periphery with a coarse toothing 32 by which it can be rotated. A coil spring 36 rests with one of its ends against the pinion 30. Fitted to the upper end of the valve spindle 24 is a diaphragm 38 whose outer edge is fixedly held between the top housing 15 and the cover 17. A ring gasket 40 seals off the chambers 68 and 69 from outside. The center portion of the diaphragm 38 is gripped and held under tension by two diaphragm-holding discs 42 and 43 in the manner shown in FIG. 1, and this sandwich-type valve component is secured with the aid of a rivet head 45 to the free end of the valve spindle 24. The upper end of the spring 36 rests against the diaphragm-holding disc 42. The top housing 15 has a bore in its sidewall, into which is fitted a guide bush 49. A pivotal lever 51, which has a handle and which can be moved in and out, is journaled in bush 49. A gasket 53 ensures the sealing towards outside.

A spyhole 55 with a glass 57 in a threaded holder 58 permits the operator to look into the mixing chamber 13 and check the position of the valve body 22.

Figure 2:
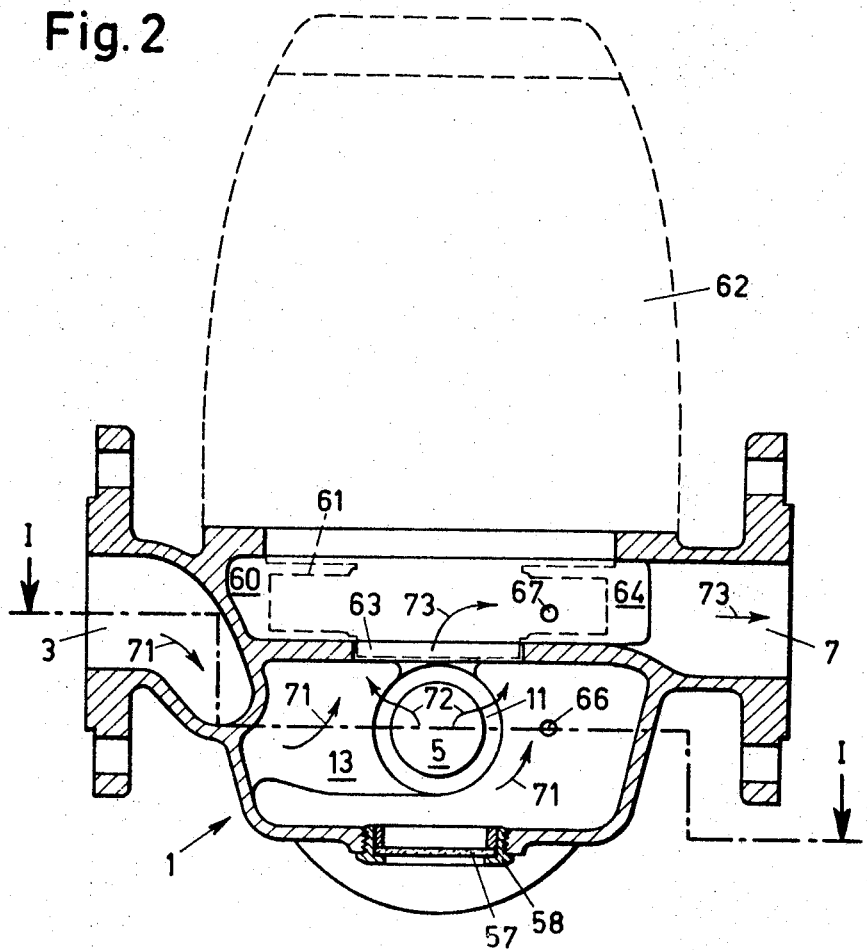
FIG. 2 shows the valve arrangement in section along II–II of FIG. 1.
Figure 3:
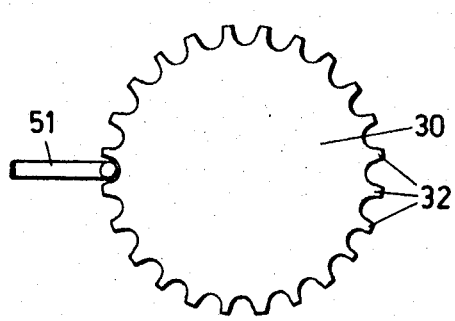
FIG. 3 shows part of the spring-prestressing device.

Adjoining the rear of the valve-housing portion defining the mixing chamber 13 is a pump housing portion 60 serving to receive an impeller 61 of a circulating pump 62. The pump is shown in outline by broken lines in FIG. 2. It is a centrifugal pump with an intake side 63 and a delivery side 64. In the illustrated embodiment, the pressure difference required to operate the system by producing the circulating action is developed by the pump between the inlet and the outlet, or between the mixing chamber 13 and the pressure or outlet line 7.

As mentioned, the diaphragm 38 divides the space confined by the top housing 15 and the cover 17 into two chambers 68 and 69. The upper chamber 68 communicates through a pressure bore 67 with the pressure side 64 of the pump, while a second bore 66 leads from the intake side or low-pressure side in the mixing chamber 13 to the chamber 69 below the diaphragm 38. For a better understanding, the drawing shows arrows 71 for the hot water, 72 for the cold water, and 73 for the mixed water.

The idea underlying this valve arrangement with differential pressure control is to employ the flow medium as the control medium and thus dispense with a special control circuit. The arrangement uses the pressure difference of the flow medium or media through the valve to adjust the control valve, as described later.

The hot water flows through the inlet 3 into the valve housing 1 and, if the valve body 22 is not closing the valve seat 9, passes the valve body 22 and into the mixing chamber 13, where it mixes with the cold water flowing through the inlet 5 and past the valve seat 11 and the nonclosing valve body 22. Thence the mixed water is drawn by the circulating pump 62 and the impeller 61 into the intake side 63 of the pump, whence, flowing through the impeller 61 with a corresponding increase in pressure, it passes to the delivery side 64. The mixed water then leaves the valve housing 1 through the outlet 7.

In this process, different pressures prevail in the two chambers 68 and 69 on the two sides of the diaphragm 38. The chamber 68 is under the higher pressure of the pressure side 64, and the chamber 69 is under the lower pressure of the intake side or the mixing chamber 13. The force resulting from the different forces acting on the two sides of the diaphragm 38 tends to deflect the latter downwards (FIG. 1). The resultant force is opposed by the force of the spring 36, and the whole system is so adjusted that a given pump speed results in a correlated mixed-water temperature. Conversely, with the temperatures of hot and cold water given, the system involves a determinate position of the valve body 22 with respect to the valve seats 9 and 11 and, accordingly, an appropriate equilibrium of the forces acting on the diaphragm 38. For the purpose of setting the conditions required, the system includes a power element, viz the spring 36, which is adjustably pretensioned. This pretension can be varied by pivoting the lever 51, which engages the toothing 32 of pinion 30 and thus rotates the pinion 30 and so lifts or lowers it by means of the threaded ring 34 mounted on the external thread 28 of the valve guide bush 26. By pulling out and pushing in, an indicated by arrows, it is possible to set the lever 51 in the next gap between two teeth of the toothing 32. Of course, the adjustment can also be effected by other means, such as a pinion with sunwheel toothing and a corresponding pinion rotatable from outside or by means of bevel gears.

With the force relations given, the setting of the valve arrangement for a particular speed of the circulating pump 62 is therefore determinate. Thus, if the flow through such a valve arrangement or the mixing ratio between hot water and cold water is to be varied, it will be necessary to adjust the valve body 22 with respect to the two valve seats 9 and 11. In the embodiment described, the simplest way of effecting such an adjustment is by varying the speed of the impeller 61 of the circulating pump 62. This speed may be impulse-controlled from outside, as, in a central heating system, by an outside thermostat and a forward-line water thermostat acting on a regulator which varies the speed of the circulating pump 62 accordingly.

Thus, if the demand for heat rises, it will be necessary to increase the flow of heated fluid through the outlet 7. This can be effected by means of a higher mixing temperature of the water and/or a higher mixed water quantity. Thus, when the temperature falls below a preset level, the thermostats mentioned (not shown) will cause the regulator to give a signal to increase the speed of the motor of the circulating pump 62 and, according to the pump characteristics, the quantity of mixed water delivered. And, according to the resistance parabola of the system, the differential pressure (circulating pressure) developed by the pump will also rise, so that the increased difference between the forces acting on the diaphragm 38 will move the valve body 22 towards opening for the hot water, and towards closing for the cold water. This increases the hot water input and reduces the cold water input. The mixed water temperature rises, so that more and hotter water will flow from the outlet then before the start of the regulating process. According to the characteristics of the diaphragm 38 and the spring 36 and also according to the static and dynamic liquid forces acting on the valve body 22, the operation results in a new state of equilibrium, which can again be changed in the manner described by varying the speed of the circulating pump 62. It is therefore possible in a very simple manner to install the described valve arrangement in a system and operate it without requiring a special regulating circuit with special regulating media.

Such a valve arrangement can also easily be fitted into an existing system, such as a central heating system, and tuned to the total resistance thereof without requiring any further components. Such adjustment or tuning is effected as follows:

At the maximum speed of the circulating pump 62, the pretension of the spring 36 is set by means of the pinion 30 in such a way that the valve body 22 comes to rest against the valve seat 11 of the cold water inlet 5. Then the cold water supply is completely cut off. The maximum values of quantity and temperature are reached as the hot water supply is fully open and the delivery rate, determined by the top speed of the circulating pump 62, at its highest. This position can be easily observed through the spyglass 57. The adjustment is therefore extremely easy. For the rest, it is necessary to select spring 36 with the required characteristics so that, at the lowest speed of the circulating pump 62, the appropriate position of the valve body 22 is reached with respect to the two valve seats 9 and 11. This may be other extreme position of the valve, for instance, in which valve body 22 rests against the valve seat 9 of the hot water inlet, so that only cold water is admitted and circulated.

Such valve arrangements in heating systems, particularly in central heating systems, are not only attractively simple in terms of regulating technology, but also present great advantages as to trouble incidence, replacement, tuning to the existing system, and dependability.

I claim:

1. A combined circulating pump and mixing valve for a hot water heating system, comprising a single housing for the pump and the mixing valve, a hot water inlet and a cold water inlet opening into said housing, a mixed water outlet leading from said housing, a mixing valve body mounted in the housing between the inlets and the outlet, a pump impeller mounted in the housing and producing a pressure differential between an inlet and an outlet thereof, and a device receiving the pressure differential mounted in the housing, said device controlling the mixing valve body in response to the pressure differential transmitted to the device by the pump.

2. The combined circulating pump and mixing valve of claim 1, wherein the pressure differential receiving device communicates with a chamber located in the housing upstream of the impeller inlet and with a chamber located downstream of the impeller outlet.

3. The combined circulating pump and mixing valve of claim 1, wherein the pressure differential receiving device comprises a spring-load diaphragm.

4. The combined circulating pump and mixing valve of claim 3, wherein the mixing valve has a valve spindle operating the valve body, and the diaphragm is directly connected to the valve spindle.

5. The combined circulating pump and mixing valve of claim 4, comprising means for adjusting the spring load on the diaphragm for adjusting the position of the valve body.

6. The combined circulating pump and mixing valve of claim 5, wherein said adjusting means comprises a displaceable element attached to one end of the spring.

7. The combined circulating pump and mixing valve of claim 6, wherein said element is a pinion movable from the outside of the housing.

8. The combined circulating pump and mixing valve of claim 1, wherein the pressure differential device is arranged to close the hot water inlet when there is no pressure differential.

9. The combined circulating pump and mixing valve of claim 1, further comprising a spyhole in the housing for observing the position of the valve body.